G. E. BURT.
Car Starter.
No. 59,355.
Patented Nov. 6, 1866.
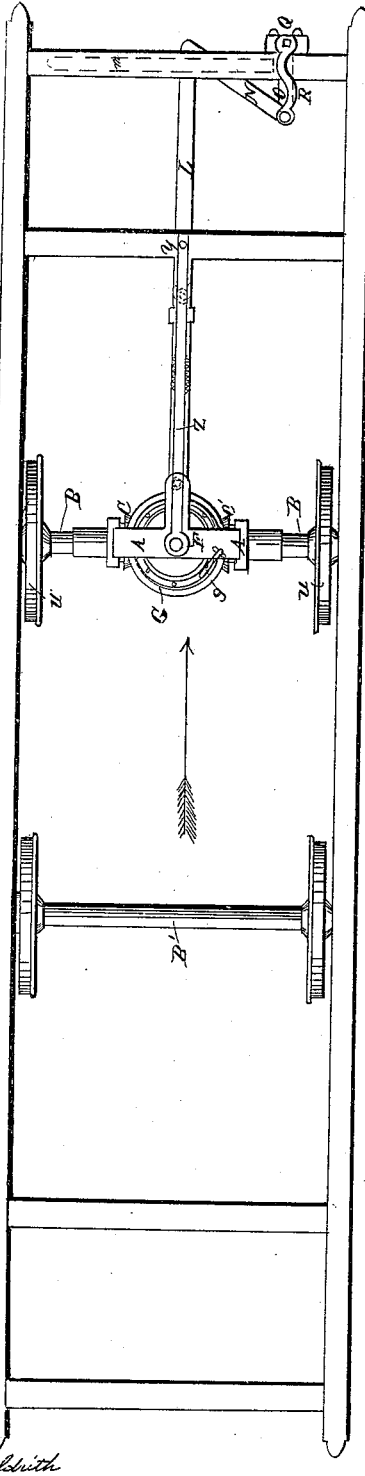
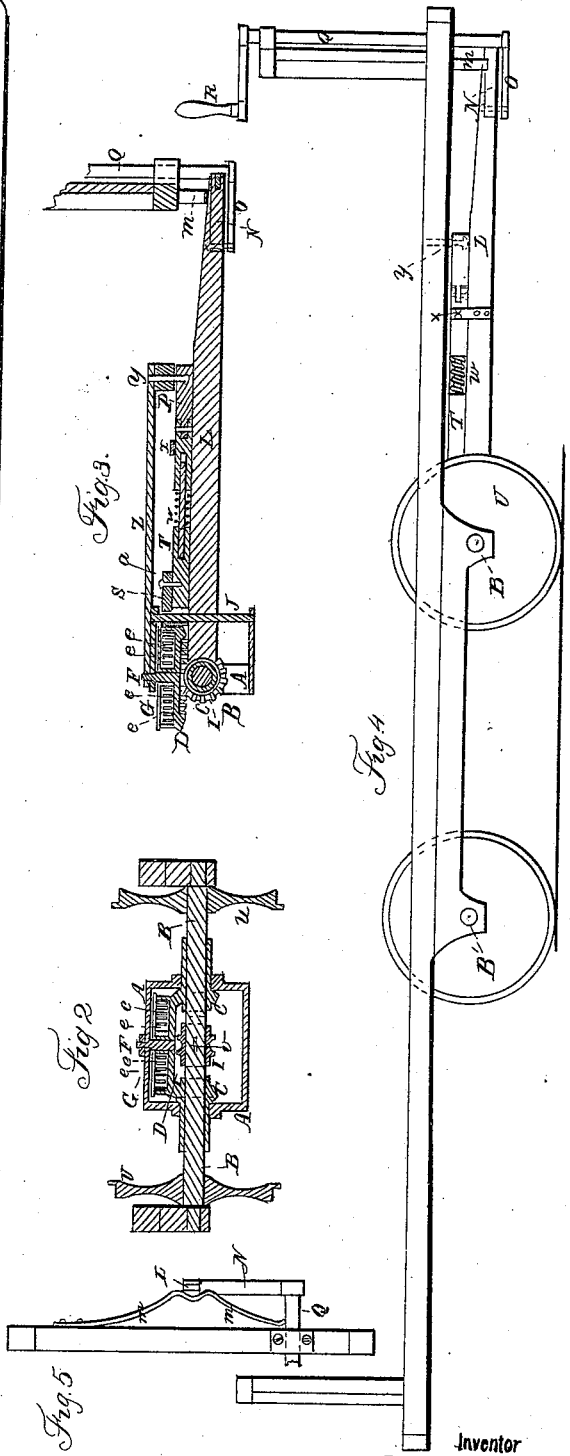
Witnesses
Edwin A. Holdrith
A. C. Burt
Inventor
George E. Burt

UNITED STATES PATENT OFFICE.

GEORGE E. BURT, OF HARVARD, MASSACHUSETTS.

IMPROVED CAR-BRAKE.

Specification forming part of Letters Patent No. 59,355, dated November 6, 1866.

*To all whom it may concern:*

Be it known that I, GEORGE E. BURT, of Harvard, in the county of Worcester, in the State of Massachusetts, have invented a new Method of Constructing Car-Brakes; and I do hereby declare that the following is a full and exact description thereof, reference being had to the accompanying drawings, making a part of this specification, in which—

Figure 1 is a bird's-eye view. Fig. 2 is a vertical transverse section through the brake-axle and wheels. Fig. 3 is a vertical longitudinal section through the brake and operating-lever. Fig. 4 is a side elevation. Fig. 5 is a view of the spring holding the operating-ing-lever L in its central position.

The same letters represent like parts in all the figures.

The nature of my invention consists in constructing car-brakes in such a manner that a moving car may be stopped and the force of the momentum of the car is retained and again transmitted to the wheels in such a manner as to propel the car onward; also, enabling the operator to retain the power or resistance used in descending an inclined plane to assist in propelling the car up an inclined plane, when wanted, without the usual loss of power caused by the friction of the brakes in descending an inclined plane or in stopping the car.

To enable others skilled in the art to make and use my invention, I will proceed to describe its construction and operation.

This brake may be attached to any car of the usual construction, and may be attached to either one or more axles.

A is the frame, which is constructed of any suitable material, and is attached to the axle B, as shown in Figs. 1, 2, and 3. The cog-wheels C and C' are constructed with teeth on their ends, which clutch into the teeth on the ends of the sleeve I, and are placed on the shaft B and held in their position by the frame A. The cog-wheel D is constructed with a recess deep enough to receive the spring $e$, and is attached to the frame A by the standard F. (Shown in Figs. 1, 2, and 3.) The recess of the wheel D is covered by the disk G, which holds the spring $e$ securely in its proper position. (Shown in Figs. 1, 2, and 3.) The pawl $s$ is pivoted to the frame A and operates in the holes perforated in the disk G. By this device the gear D may revolve backward after all the force of the spring $e$ has been transmitted to the wheels U, and the car may move freely onward without any further attention from the operator. Thus the spring $e$ is relieved of all liability of being wound in the wrong direction and broken. (Seen in Fig. 1.) I is a sleeve, placed near the center of the axle B, and is made to revolve with the axle by the stud $v$; but it may slide endwise in the slot $r$. (Shown in Fig. 2.) L, the operating-lever, is attached to the frame A by the rod J, in such a position that the rear end of the lever will rest in the recess formed in the sleeve I, and the forward end is attached to the pitman N, which is connected with the crank-arm O on the shaft Q. (Shown in Figs. 1 and 3.) R is the operating-crank. (Shown in Figs. 1 and 4.) S is a friction-brake, and is attached to the lever T by the pin $a$. The lever T is so constructed that it may spring endwise by means of the spring $w$. It is constructed with a pivoted arm, P. The lever T is held in its position on the operating-lever L by the guide $x$ and rod J. The arm P is attached to the car by the pivot Y. Z is a brace for holding the brake in its position on the shaft B. (Shown in Figs. 1, 3, and 4.) $m$ is a spring, which holds the operating-lever L in its central position. (Seen in Fig. 5.)

Operation: When the car is set in motion on the track in the direction indicated by the arrow, with the brakeman in his place on the platform, the handle of the operating-crank should stand in such a position that the operating-lever L will rest in the seat in the spring $m$, as seen in Fig. 5. While in this position the car runs freely forward; but when the car is to be stopped the operator moves the operating-crank R to the left. The operating-lever L being attached by the pitman N to the crank-arm O, the lever being attached by the rod J, which makes a fulcrum, the lever L moves the sleeve I on the axle B into the cog-wheel C'. This turns the gear-wheel D, and, the spring $e$ being attached to the wheel D and disk G, which starts to revolve with the wheel D, (but the pawl $s$ stops it from revolving forward,) the whole onward force of the car is exerted upon the spring $e$. The car is thus stopped with an easy motion, and the whole power is transmitted into the spring $e$.

By moving the operating-crank R back to the right, which, operating the lever L, moves the sleeve I from cog-wheel C' to cog-wheel C, the stud $v$ in the slot $r$ preventing the sleeve from revolving on the shaft B, the whole power in the spring is transmitted to the wheels U to turn them forward, and thus start the car and propel it onward.

When descending an inclined plane, and it is desirable to retain power to assist in ascending an inclined plane, the operation is as follows: The operator moves the operating-crank from right to left, and allows it to remain long enough to retard the motion of the car to such a degree as he desires. He then moves the crank half-way between its positions on the right and left, and in this position the spring $m$ holds the operating-lever L in the center of the car. By this operation a portion of the force of the car running down an inclined plane is transmitted to the spring, and if the inclined plane is of considerable length the operation may be repeated at intervals in order to keep the car at the proper speed. The power thus accumulated in the spring may be retained as long as desirable, and used to propel the car up an inclined plane in the same manner as it is used to start the car.

The operating-lever L, in combination with the lever T and brake S, holds the power of the spring $e$ while the sleeve I is being moved from one cog-wheel to the other, or while the lever L is held in its central position. The operating-lever L, as it moves from one position to the other when changing the brake, passes the point where the pivoted arm P of the lever T is attached to the car-frame, and the pivoted arm is brought into a straight line with the operating-lever L, and the brake S is forced forward against the cog-wheel D, and holds it from revolving while the sleeve is held directly between the cog-wheels C and C'. The operating-lever L is now held in its central position by the spring $m$, and the sleeve is not clutched into either of the wheels C or C'. While the operating-lever L is held in this position the car may move backward or forward any distance without having any effect upon the spring $e$ or the brake.

When the operating-lever is moved either to one side or the other, so as to cause the sleeve I to clutch into either of the cog-wheels C or C', the pivoted arm P swings on the pivot Y, and draws the brake S back, and leaves the cog-wheel D free to revolve. The spring $w$ operates to regulate the pressure caused by the arc made by the swinging of the pivoted arm P. By this arrangement the car can be moved in either direction, and by extending the lever L to the other end of the car the brake may be operated with equal facility from either end.

It will be seen by this device that the power usually lost in descending an inclined plane or in stopping a car is retained, and is readily applied in starting the car forward with nearly the same velocity as it had before it was stopped, or can be retained and used when wanted to assist in ascending any inclined plane, making a great saving of power; also, a saving in wear of brakes; also, a great saving of strain and labor for either the steam-engine or horses that may be employed in running the cars; also, in making the brakes more effectual and secure in icy weather, when the common brake gets loaded with ice; also, avoiding the sudden and unpleasant jerking and consequent strain which often occur in stopping and starting the cars.

Having thus described the nature and operation of my invention, what I claim as new, and desire to secure by Letters Patent, is—

1. The combination of the wheel D, the disk G, the pawl $s$, and the stud F with the spring $e$.

2. The lever T, the spring $w$, the arm P, and the brake S, in combination with the pivot Y, operating substantially as described, for the purpose set forth.

3. The spring $m$, in combination with the lever L, substantially as described, and for the purpose set forth.

GEORGE E. BURT.

Witnesses:
 EDWIN A. HILDRETH,
 E. E. BURT.